United States Patent [19]

Yokoyama

[11] Patent Number: 5,632,008
[45] Date of Patent: May 20, 1997

[54] METHOD OF AND APPARATUS FOR NAVIGATION DISPLAY

[75] Inventor: Hiromi Yokoyama, Kawasaki, Japan

[73] Assignee: Fujitsu Limited, Kawasaki, Japan

[21] Appl. No.: 693,501

[22] Filed: Aug. 7, 1996

Related U.S. Application Data

[63] Continuation of Ser. No. 299,261, Sep. 1, 1994, abandoned.

[30] Foreign Application Priority Data

Mar. 8, 1994 [JP] Japan ..................... 6-036654

[51] Int. Cl.[6] .................................................. G06F 15/00
[52] U.S. Cl. ................................................... 395/142
[58] Field of Search ............................. 395/141, 142, 395/143, 133; 345/16, 17, 135

[56] References Cited

U.S. PATENT DOCUMENTS 5,307,453  4/1994  Takashiro ..................... 395/133
5,309,549  5/1994  Iwamoto et al. ............... 395/121
5,345,546  9/1994  Harada et al. ................. 395/142
5,396,586  3/1995  Van Aken ..................... 395/141

*Primary Examiner*—Phu K. Nguyen
*Attorney, Agent, or Firm*—Staas & Halsey

[57] ABSTRACT

A method and apparatus for navigation display when a graphic element is to be created in relation to a graphic element which has already been generated on a two-dimensional CAD system. A position which may possibly be indicated is displayed for navigation to allow the user to produce a drawing on a display screen with improved operation efficiency. In order to display particular points of a graphic element close to a cursor, a search range for searching for the graphic element is first obtained. Then, the present position of the cursor is obtained, and an identifier of the graphic element in the search range around the present cursor position is obtained. All particular points of the obtained graphic element are determined, and displayed on the display screen. One of the determined particular points which is closest to the cursor is determined, and displayed in emphasis on the display screen.

7 Claims, 15 Drawing Sheets

| 2 |
| --- |
| $x_0$ |
| $y_0$ |
| a |
| b |
| $\ell$ |

METHOD OF AND APPARATUS FOR NAVIGATION DISPLAY

This application is a continuation, of application Ser. No. 08/299,261, filed Sep. 1, 1994, now abandoned.

BACKGROUND OF THE INVENTION

1. Field of the Invention

The present invention relates to a method of and an apparatus for navigation display to display particular points in a graphic element, and more particularly, to a method of and an apparatus for navigation display to display guidance positional information about a position which is to be possibly indicated next, when a graphic element such as a straight line is to be created in connection to or contact with an existing graphic element such as a line segment, a circle, or an arc in an interactive system such as a computer-aided design (CAD) system.

2. Description of the Related Art

Two-dimensional CAD systems are capable of generating or editing drawings such as design drawings on a graphic display screen using basic graphic elements including a straight line, a circle, an arc, etc. When a drawing is completed on the graphic display screen, it may be either outputted as a hardcopy drawing by a plotter or stored in a storage medium for subsequent use.

To create a circle, for example, by a two-dimensional CAD system, the circle can easily be created on a graphic display screen based on commands entered from a keyboard or input signals from a digitizer. However, a mouse allows the user to carry out such an operation that a circle is created or, otherwise edited by moving a created circle more intuitively on the graphic display screen.

To create a straight line segment, for example, on a graphic display screen, a mouse cursor on the graphic display screen is moved to a position where one end of the line segment is to be located, and the position is clicked by a button on the mouse so as to serve as a start of the line segment. Then, a position on the graphic display screen where the other end of the line segment is to be located is clicked by the mouse, and serves as an end of the line segment. The end points of the line segment are indicated in this manner. For determining the end points of the line segment, therefore, it is necessary to move the mouse cursor to the positions which are to serve as the end points and then to hit or click the positions with the mouse.

When such a line segment is to be created in relation to a graphic element, e.g., to be connected to a generated graphic element, however, the user is often unable to easily recognize which position on the graphic element is to be used as an end point of the line segment that is to be created. Frequently, a drawing may be created which is different from what the user has had in mind. In such a case, efforts to create a drawing are repeated several times until finally a drawing will be produced as desired by the user. Such a process is however wasteful. Furthermore, if a drawing contains an intricate area, then it is highly difficult to find a position to be hit or clicked in such an intricate area. Accordingly, a process of generating a drawing which contains an intricate area needs an extra operation to enlarge the intricate area.

Among the conventional CAD systems is a CAD system with a navigation display function to display a particular point closest to a cursor on a graphic display screen when the cursor approaches a graphic element which has been generated. The navigation display function helps the user recognize the displayed particular point as one candidate for a position to be hit or clicked. The CAD system with the navigation display function can easily be operated by the user.

However, the conventional navigation display function displays only one of the particular points that are possessed by the generated graphic element, which one of the particular points which is closest to the cursor. Consequently, the user is given only partial information about the particular points of the graphic element, and such partial information tends to invite erroneous operations due to insufficient navigation display.

SUMMARY OF THE INVENTION

It is therefore an object of the present invention to provide a method of and an apparatus for navigation display to minimize misperceptions and erroneous operations in generating drawings on a two-dimensional CAD system.

To achieve the above object, there is provided in accordance with the present invention a method of navigation display for displaying particular points of a graphic element displayed on a display screen, comprising the steps of obtaining, from a search range setting table, a search range disposed around a cursor on the display screen for searching for a graphic element having at least a portion thereof contained in the search range, obtaining a present position of the cursor, obtaining an identifier of a graphic element which is positioned in the search range that is disposed around the present position of the cursor, determining all particular points of the graphic element, displaying all the particular points which have been determined on the display screen, determining one of the particular points which is closest to the cursor, and displaying the determined one of the particular points in emphasis.

According to the present invention, there is also provided an apparatus for navigation display for displaying particular points of a graphic element, comprising graphic element information memory means for storing graphic element information relative to graphic elements including a straight line, a circle, and an arc which are required to produce a drawing, display means for displaying graphic elements based on graphic element information read from the graphic element information memory means, cursor information recognizing means for recognizing a search range for a graphic element, a position of a cursor being displayed by the display means, and a hit position where the displayed cursor is clicked, graphic element searching means for recognizing a graphic element in the search range, among the graphic elements being displayed by the display means, and outputting an identifier of the recognized graphic element, particular point generating means for generating all particular points of the graphic element based on the identifier thereof which are outputted from the graphic element searching means, rubber banding generating means for generating a rubber banding pattern of the graphic element from the present position of the cursor and the hit position which are recognized by the cursor information recognizing means, and display position calculating means for calculating display positions for the particular points generated by the particular point generating means and the rubber banding pattern generated by the rubber banding generating means, and instructing the display means to display the particular points and the rubber banding pattern in the calculated display positions.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
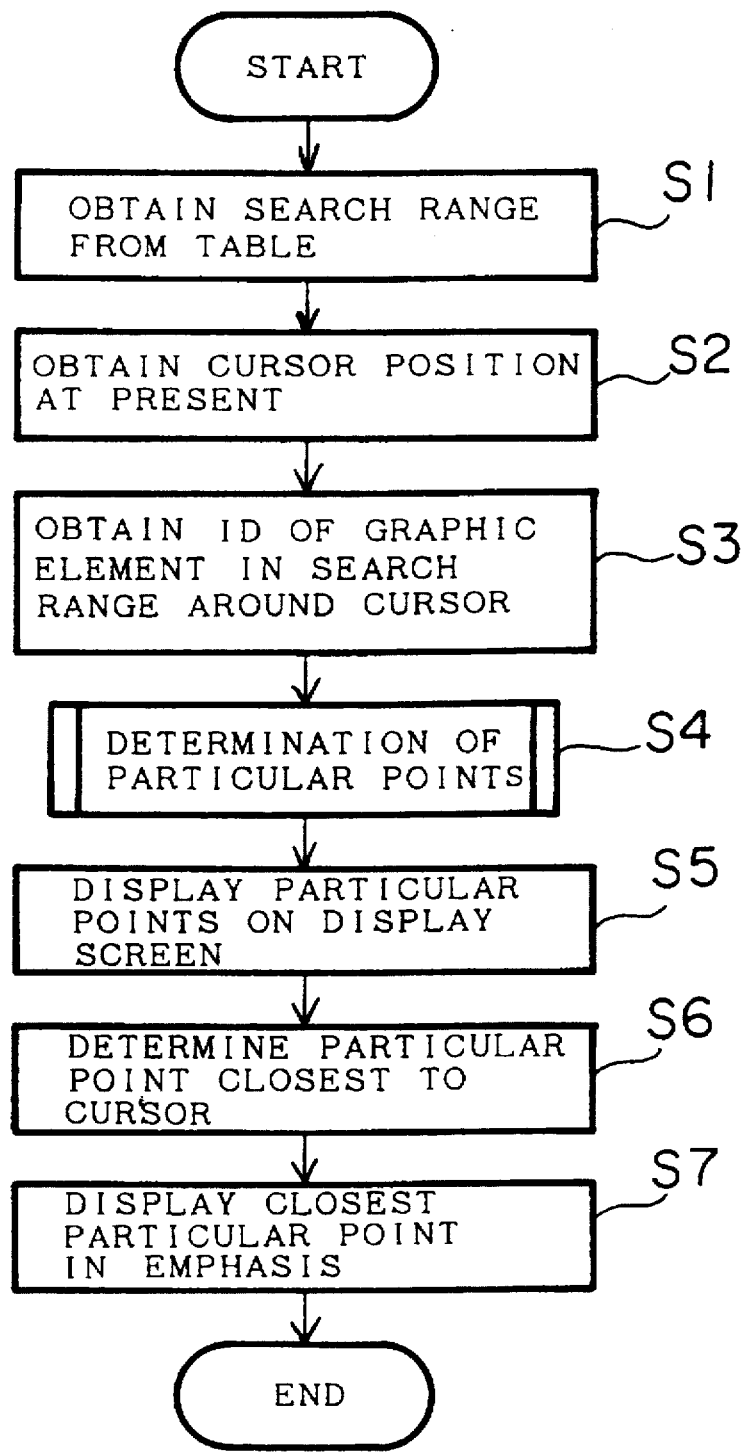
FIG. 1 is a flowchart of an operation sequence illustrative of the principles of the present invention.

FIG. 1 shows an operation sequence illustrative of the principles of the present invention. A navigation display method according to the present invention will first be described below with reference to FIG. 1.

In the navigation display method, a search range is obtained from a search range setting table in a step S1. A search range is a rectangular range, for example, established around the position of a cursor on a graphic display screen, and can be set as desired by the user. If "5" is set in the search range setting table, then a search range in the shape of a square having a size 5 mm×5 mm is established around the position of the cursor, and a graphic element is searched for in the established search range.

Then, the position of the cursor at the present time is obtained in a step S2. The present cursor position can be obtained based on movement information from a mouse. Thereafter, a step S3 determines whether there is a graphic element in the search range around the present cursor position obtained in the step S2, and, if a graphic element is found in the search range, obtains an identifier (ID) of the graphic element.

Then, a step S4 determines all particular points of the graphic element which has been obtained in the step S3. Specifically, all characteristic points possessed by the obtained graphic element are determined. All the particular points determined in the step S4 are displayed in a step S5.

One of the particular points which is closest to the cursor is determined from the positional relationship between all the particular points determined in the step S4 and the position of the cursor in a step S6. The determined particular point closest to the cursor is then displayed in emphasis in a step S7. Displaying the particular point closest to the cursor in emphasis is carried out in such a way that the particular point is distinguished from other particular points. Specifically, a displayed graphic pattern indicating the particular point is highlighted, displayed in a different graphic pattern, or displayed in a different outstanding color.

The operation sequence shown in FIG. 1 is repeatedly carried out in every 30 milliseconds, for example.

Figure 2:
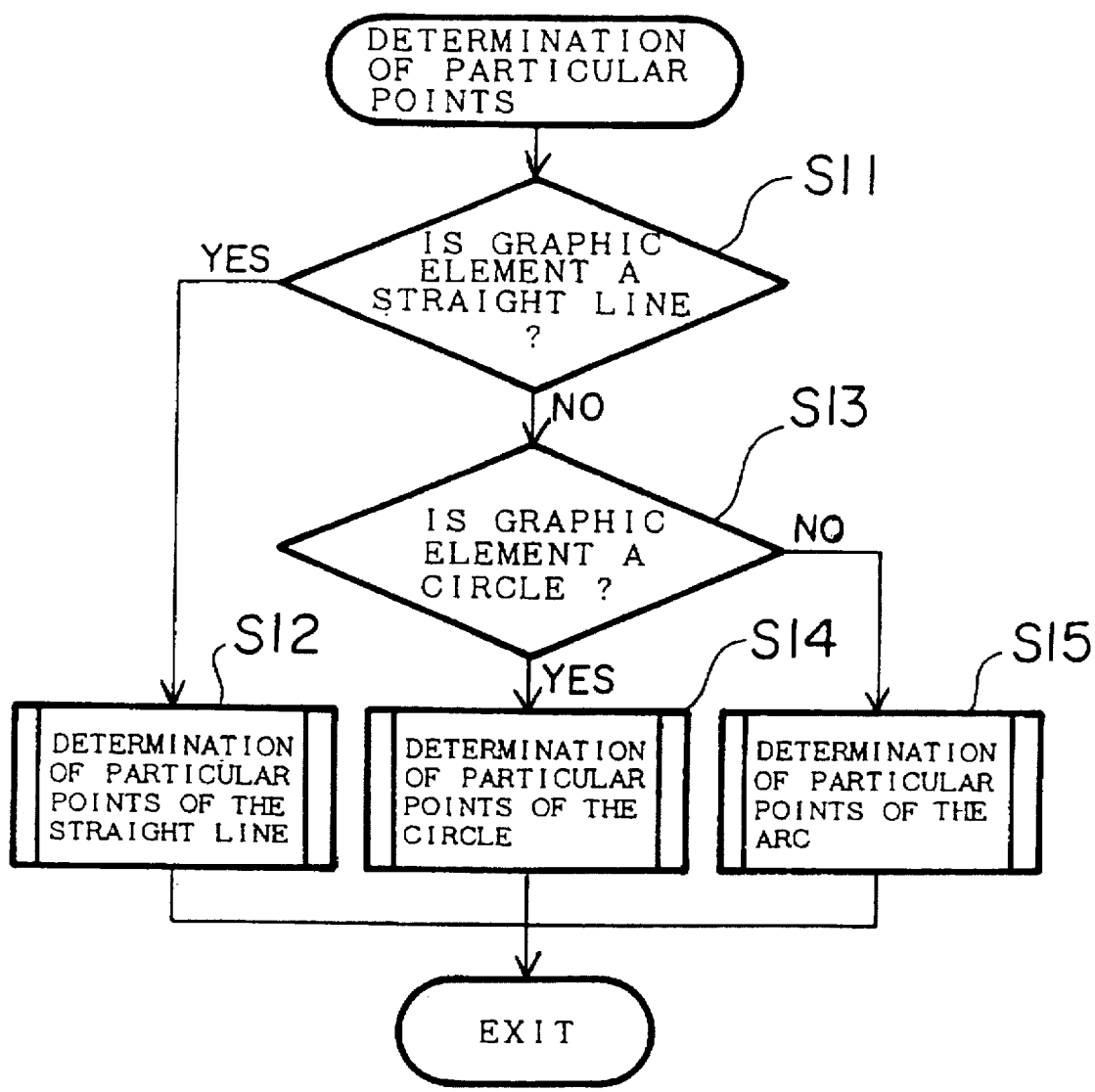
FIG. 2 is a flowchart of a detailed process of determining particular points.

FIG. 2 shows a detailed process of determining particular points. As shown in FIG. 2, it is determined whether the graphic element which has been searched for is a straight line or not in a step S11. Specifically, the step S11 determines whether data representing the graphic element contain a type number indicative of a straight number from the identifier of the obtained graphic element. If the graphic element is a straight line, then control goes to a process of determining all particular points of a straight line, and all particular points of the straight line are determined in a step S12.

If the graphic element is not a straight line in the step S11, then a step S13 determines whether the graphic element is a circle or not. If data representing the graphic element contain a type number indicative of a circle based on the identifier of the obtained graphic element, i.e., if the graphic element is a circle, then control goes to a process of determining all particular points of a circle, and all particular points of the circle are determined in a step S14. If the data do not contain a type number indicative of a circle in the step S13, i.e., if the graphic element is an arc, then control goes to a process of determining all particular points of an arc, and all particular points of the arc are determined in a step S15.

For the sake of brevity, the graphic element has been described as being a straight line, a circle, or an arc for the determination of particular points. Actually, however, particular points may also be determined even if the graphic element is a rectangle, an ellipse, or the like.

Figure 3:
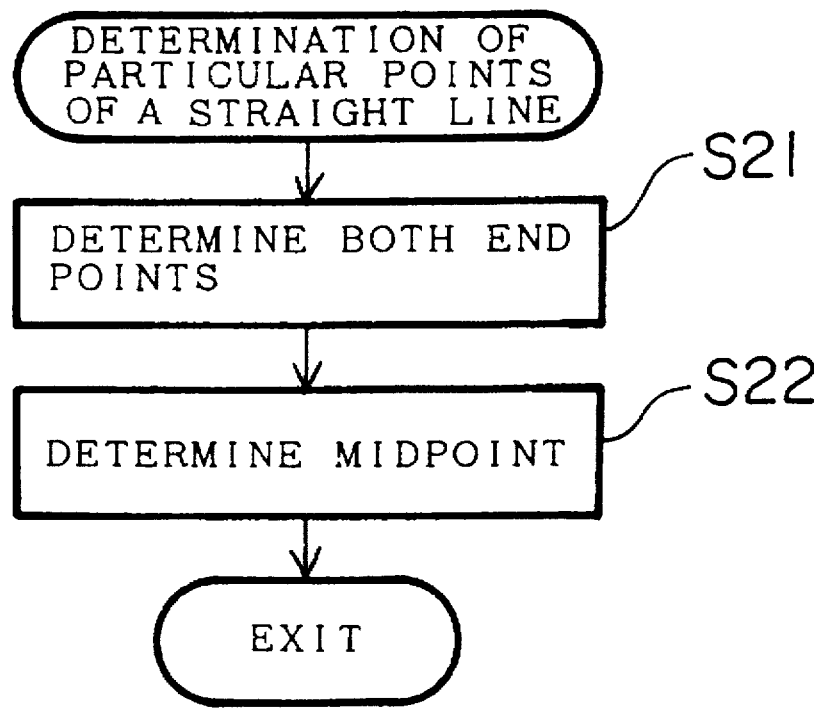
FIG. 3 is a flowchart of a detailed process of determining particular points of a straight line.

FIG. 3 shows a detailed process of determining particular points of a straight line. As shown in FIG. 3, a step S21 determines both end points of a straight line, and then a step S22 determines a midpoint of the straight line. Thus, all end points and midpoint of the straight line, which are particular points of the straight line, are determined.

Figure 4:
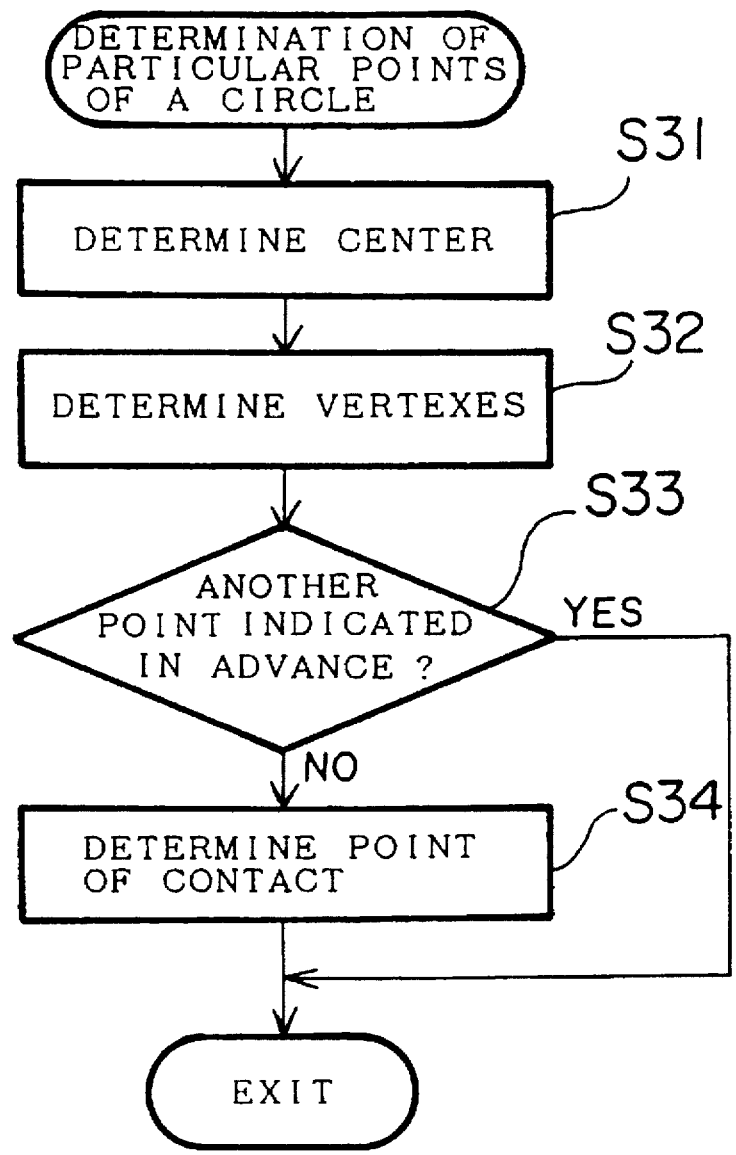
FIG. 4 is a flowchart of a detailed process of determining particular points of a circle.

FIG. 4 shows a detailed process of determining particular points of a circle. As shown in FIG. 4, a step S31 determines a center of a circle. Then, a step S32 determines vertexes of the circle, i.e., four points where the circle and x- and y-axis lines passing through the center intersect with each other. A next step S33 determines whether another point has been indicated in advance or not. Specifically, the step S33 determines whether a start point of a certain graphic element, e.g., a straight line segment, has been hit in order to create the straight line segment or not. If a process of creating a graphic element has not been initiated and only the cursor has been moved in the step S33, then since all particular points of the circle have been determined, the process shown in FIG. 4 is finished. If another point has already been hit in the step S33, then a point of contact on the circumference of the circle with a graphic element being created which is displayed in rubber banding is determined as a particular point in a step S34.

Figure 5:
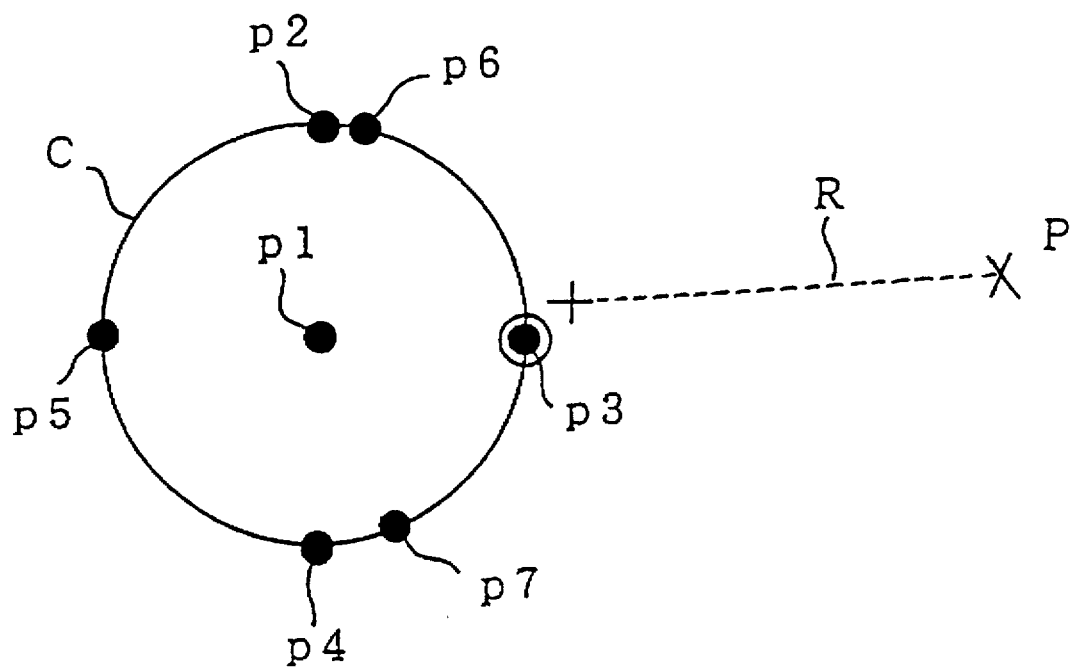
FIG. 5 is a diagram showing particular points determined by the process of determining particular points of a circle.

FIG. 5 shows particular points determined by the process of determining particular points of a circle. In FIG. 5, if it is assumed that a circle C which has already been drawn on a display screen is contained in a search range around a cursor, then particular points of the circle C are determined according to the process shown in FIG. 4. First, a center p1 of the circle C is determined, and then vertexes p2, p3, p4, p5 on the circumference of the circle are determined. In the event that a start point of a straight line segment, for example, has already been hit at a point P indicated by "X" in order to create the straight line segment, a line segment R is temporarily displayed in rubber banding on the display screen, the line segment R having a start point at the position P and an end point at a cursor position indicated by "+". The process of determining particular points has been started when the cursor has approached the circle C. If the center p1 and the vertexes p2, p3, p4, p5 of the circle C have already been determined, then points p6, p7 of contact between the circle C and straight line segments to be created are determined as particular points, and displayed on the display screen. In this manner, all the particular points p1–p7 that could occur to the circle C are determined in the process of determining particular points of a circle. Subsequently, one of the particular points which is closest to the cursor, i.e., the particular point p3 in the illustrated embodiment, is determined, and displayed in emphasis on the display screen.

Figure 6:
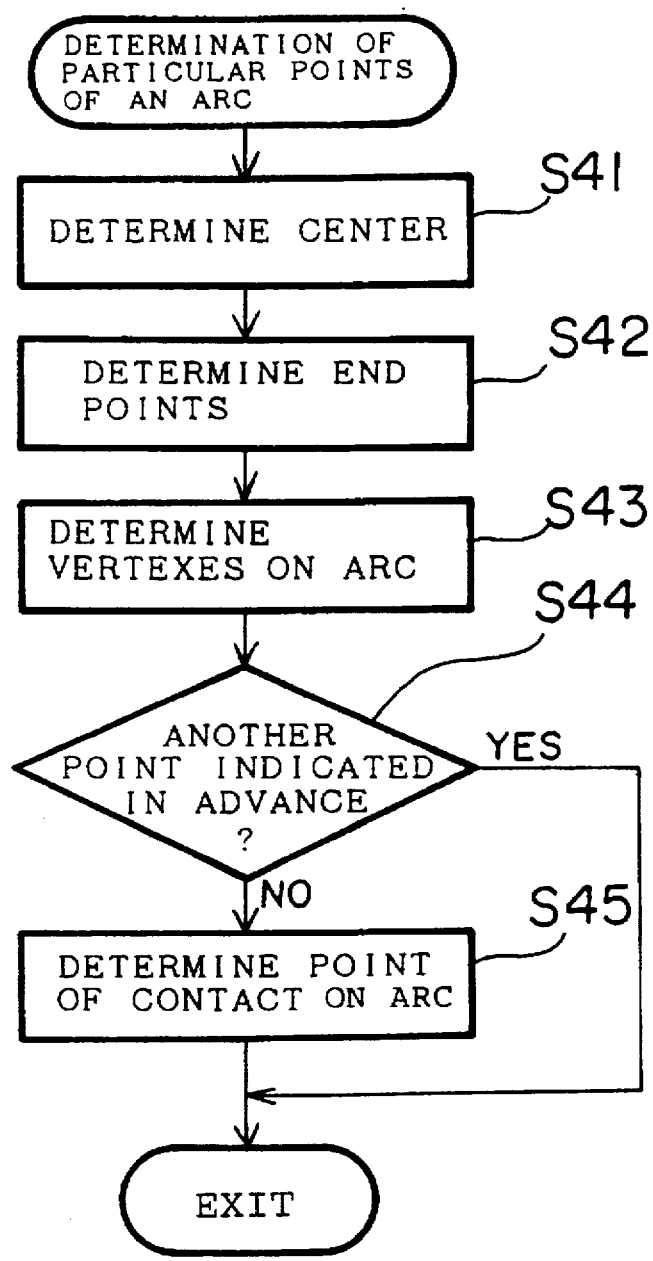
FIG. 6 is a flowchart of a detailed process of determining particular points of an arc.

FIG. 6 shows a detailed process of determining particular points of an arc. As shown in FIG. 6, a step S41 determines a center of an arc. Then, a step S42 determines end points of the arc. A step S43 determines vertexes of the arc, i.e., points where the arc and x- and y-axis lines passing through the center intersect with each other. A next step S44 determines whether another point has been indicated in advance or not. Specifically, the step S44 determines whether another point has already been hit somewhere in order to create a graphic element or not. If a process of creating a graphic element has not been initiated and only the cursor has been moved in the step S44, then since all particular points of the arc have been determined, the process shown in FIG. 6 is finished. If another point has already been hit in the step S44, then a point of contact on the arc with a graphic element being created which is displayed in rubber banding is determined as a particular point in a step S45.

Figure 7:
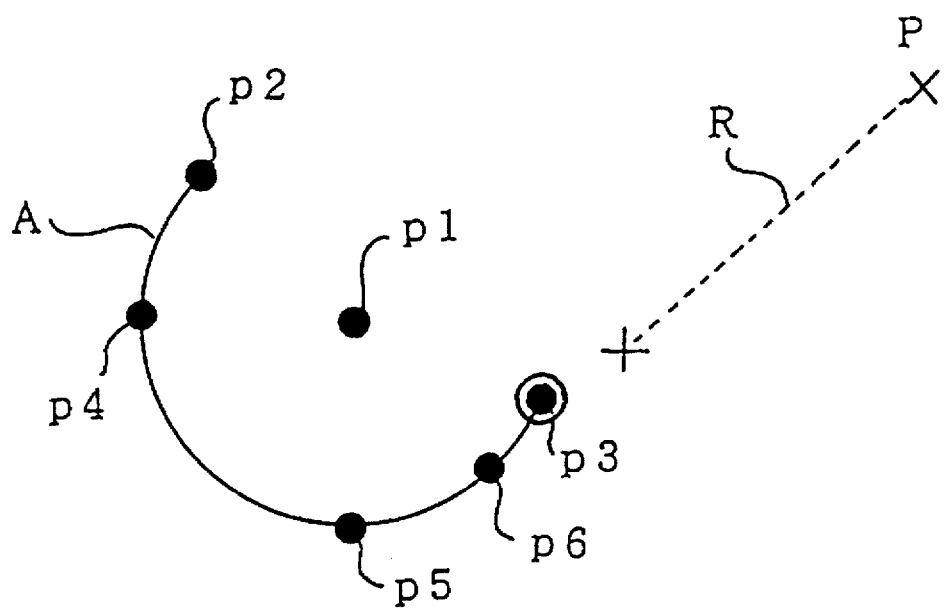
FIG. 7 is a diagram showing particular points determined by the process of determining particular points of an arc.

FIG. 7 shows particular points determined by the process of determining particular points of an arc. In FIG. 7, if it is assumed that an arc A which has already been drawn on a display screen is contained in a search range around a cursor, then particular points of the arc A are determined according to the process shown in FIG. 6. First, a center p1 of the arc A is determined, and then both end points p2, p3 of the arc A, and vertexes p4, p5 on the arc A are determined. In the event that a start point of a straight line segment, for example, has already been hit at a point P indicated by "X" in order to create the straight line segment, a line segment R is temporarily displayed in rubber banding on the display screen, the line segment R having a start point at the position R and an end point at a cursor position indicated by "+". The process of determining particular points has been started when the cursor has approached the arc A. If the particular points p1, p2, p3, p4, p5 of the arc A have already been determined, then a point p6 of contact between the arc A and a straight line segment to be created is determined as a particular point, and displayed on the display screen. In this manner, all the particular points p1–p6 that could occur to the arc A are determined in the process of determining particular points of an arc. Subsequently, one of the particular points which is closest to the cursor, i.e., the particular point p3 in the illustrated embodiment, is determined, and displayed in emphasis on the display screen.

Figure 8:
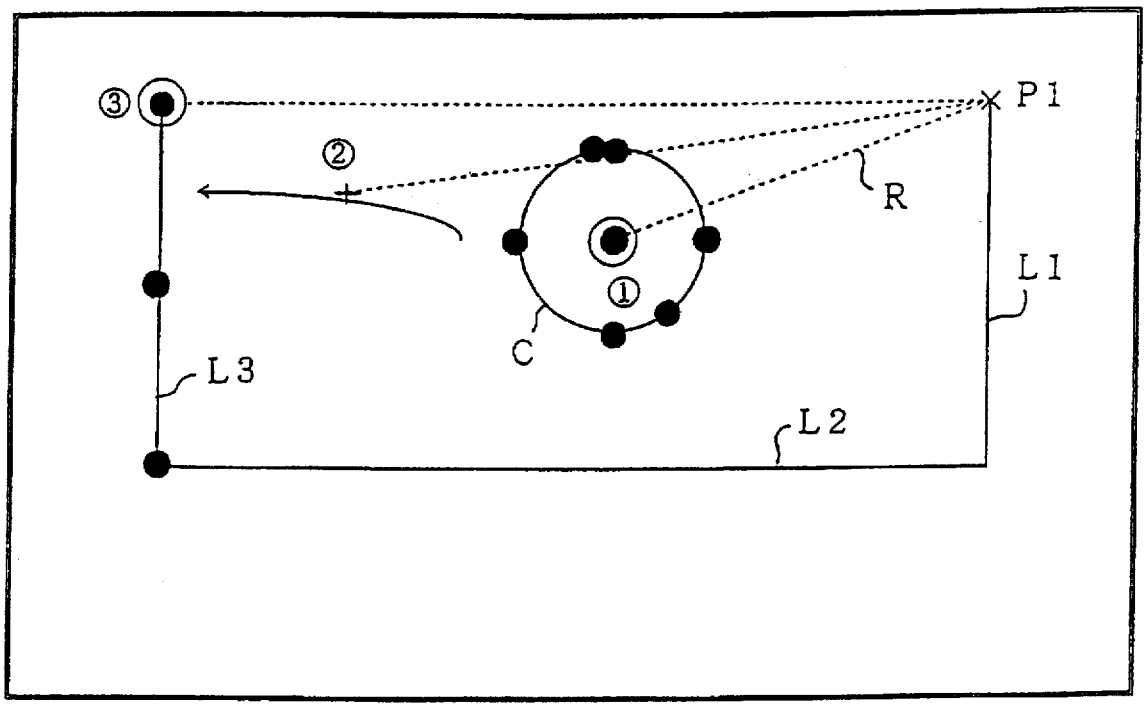
FIG. 8 is a diagram showing displayed particular points used to create a line segment.

FIG. 8 shows displayed particular points used to create a line segment.

It is assumed that three line segments L1, L2, L3 and one central circle C have been drawn on a display screen, and a line segment having a start point positioned at an end point of the line segment L1 is to be created. First, when a position P1 indicated by "X" is hit or clicked by the cursor, a temporary line segment R having a start point at a position P1 and an end point at the position of the cursor is displayed in rubber banding, as represented by the broken line in FIG. 8. The cursor is then moved to approach the circle C. When a portion of the circle C is located in a search range which is preset around the cursor for a certain graphic element, a graphic element composed of the circle C is detected. Particular points possessed by the circle C are then displayed. In the illustrated embodiment, markers indicated as black dots representing particular points are displayed. Specifically, the center of the circle, the four vertexes on the circumference of the circle, and two points of contact on the circumference of the circle are displayed as the particular points. If the cursor is brought in the vicinity of the center, indicated by ①, of the circle C, the center is recognized as a particular point closest to the cursor, and displayed in emphasis, e.g., as a double circle. Since the line segment drawn between the position P1 and the center of the circle is displayed in rubber banding and the particular point is displayed in emphasis, the user can understand that if the center of the circle is hit or clicked when it is displayed as a double circle, then the center will become the other end point of the straight line to be created.

To draw a line tangentially to the circle C, the cursor is moved in the vicinity of a point of contact on the circle C, and a particular point displayed in a position at the point of contact on the circle C is displayed in emphasis. When a line tangential to the circle C is drawn with a line segment having a start point at the position P1, a position to be hit or clicked to indicate an end point of the line segment is displayed as a guide in advance, and a line segment drawn as a tangential line is schematically displayed in rubber banding. When the cursor is moved away from the circle C, the displayed particular point is eliminated from the display screen.

When the cursor is then moved to a position ②, for example, in a region where no graphic element is present, no graphic element is not detected as no originally drawn graphic element is present in the region. Therefore, as usual, a position where the cursor indicated by "+" is present represents the end point of a line segment to be created, allowing the user to recognize that a line segment displayed in rubber banding will be drawn directly as a line segment.

When the cursor is moved in the vicinity of the line segment L3, the line segment L3 is detected, and particular points of the line segment are displayed. The particular points of the line segment include both end points and a central point thereof. When the cursor is moved in the vicinity of one end point, indicated by ③, of the line segment L3, the particular point at the position ③, among the three particular points, is displayed in emphasis. Consequently, if the end point of a line segment whose start point is at the position P1 is to be located at one of the end points of the line segment L3, then the user is only required to hit or click a particular point which is displayed in emphasis. The creation of a line connected to an existing line segment is thus facilitated.

Figure 9:
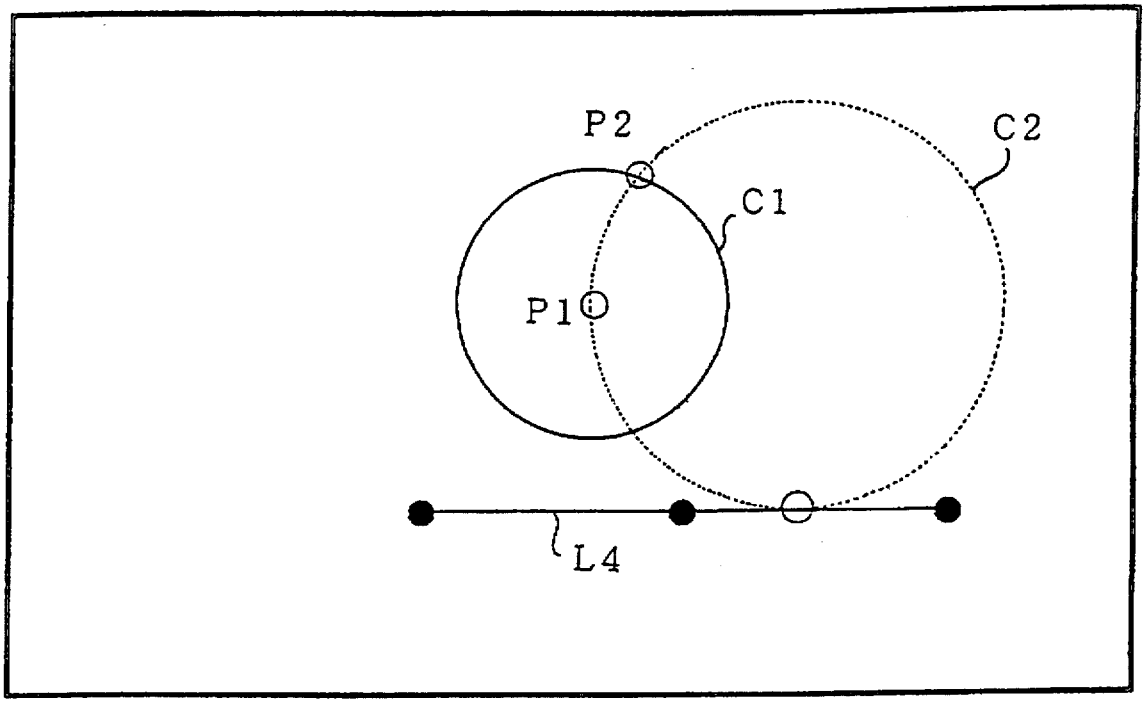
FIG. 9 is a diagram showing displayed particular points used to create a circle.

FIG. 9 shows displayed particular points used to create a circle.

It is assumed that a line segment L4 has already been drawn on a display screen, and a circle is to be created near the line segment L4 or in contact with the line segment L4. First, when a position P1 is hit or clicked, a circle C1 having its center at the position P1 is temporarily displayed. The circle C1 is displayed in rubber banding with the center at the position P1 and also with the cursor indicated as a point on the circumference of the circle C1. The temporarily displayed circle C1 has its radius freely variable as the cursor moves toward and away from the position P1, allowing the user to know beforehand how big a circle which will be drawn can be. Then, when a position P2 is hit or clicked, a circle C1 which is determined by the center at the position P1 and a radius corresponding to the distance from the position P1 to the position P2 is created, and displayed in a pattern as a temporarily displayed circle different from an established graphic element. For example, if an established graphic element is displayed in green, then the circle C1 is displayed in a different color, e.g., yellow. If a circle indicated by a center and a radius is to be created, then a key indicative of establishing a graphic element is pressed, and the circle C1 is established and its displayed color changes to the color of an established graphic element.

When the cursor is moved at the time the circle C1 is displayed as a temporarily displayed circle in a color different from the color of another graphic element, i.e., before the circle C1 is established, a circle C2 which is determined by the positions P1, P2 and the position of the cursor is displayed in rubber banding. Now, the creation of a circle with the indicated three points is initiated. The circle C2 is displayed in a pattern different from other graphic elements, e.g., in a white dotted line. When the cursor approaches the existing line segment L4, the particular points of the line segment L4, i.e., the center and end points of the line segment L4, are displayed as a guide for indicating a third point. In order to create a circle in contact with the line segment L4, the cursor is moved onto the line segment L4 while viewing the circle C2 displayed in rubber banding, for thereby easily finding and indicating a third point on the line segment L4.

Figure 10:
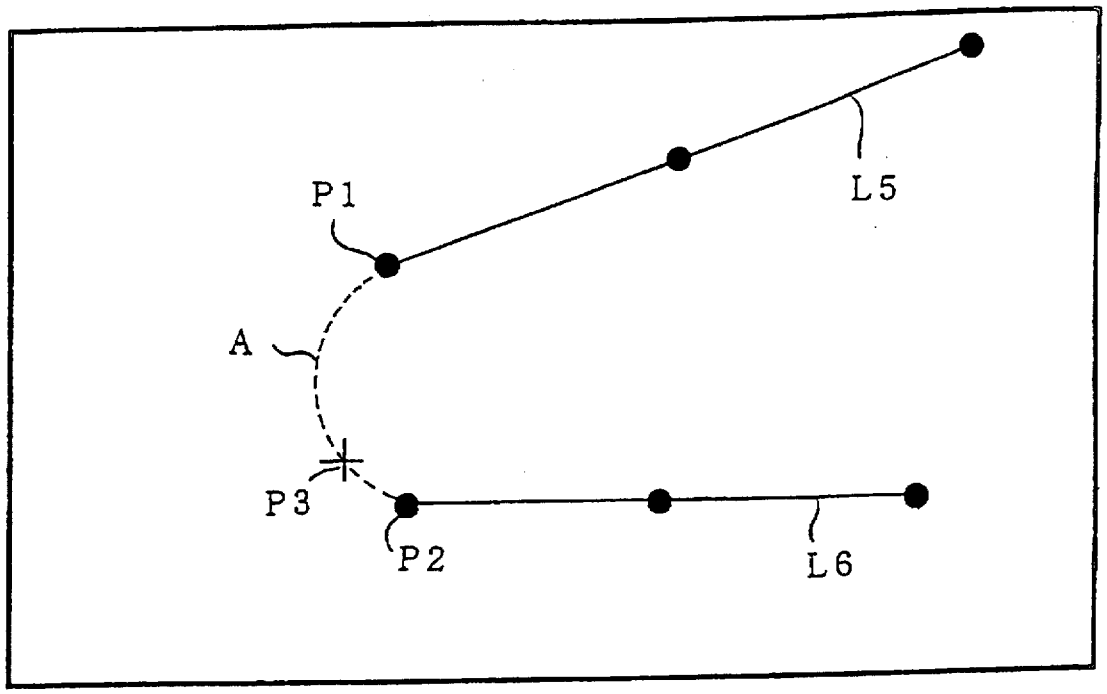
FIG. 10 is a diagram showing displayed particular points used to create an arc.

FIG. 10 shows displayed particular points used to create an arc.

It is assumed that two line segments L5, L6 have already been drawn on a display screen, and an arc is to be created which interconnect the line segments L5, L6. First, when the cursor is moved in the vicinity of the line segment L5 with a view to determining one end point of an arc, the line segment L5 is detected, and particular points of the line segment L5, i.e., its end points and center, are displayed. Inasmuch as a position to serve as a start point of an arc to be generated has been indicated in advance by a particular point and a particular point close to the cursor is displayed in advance, it is very easy to locate and hit a position P1. Then, when the cursor is moved in the vicinity of the line segment L6 in order to determine the other end point of the arc, the line segment L6 is detected, and three particular points of the line segment L6 are displayed with a particular point close to the cursor being displayed in emphasis. When a position P2 is hit or clicked at the time it is displayed in emphasis, a line interconnecting the positions P1, P2 is displayed. From this time on, the position of the cursor serves as a third position for determining an arc. Each time the cursor is moved, an arc A passing through these three points is displayed in rubber banding. When a desired arc A is displayed in rubber banding, the cursor position P3 is hit, determining the third point which specifies the arc, whereupon the arc A is established.

Figure 11:
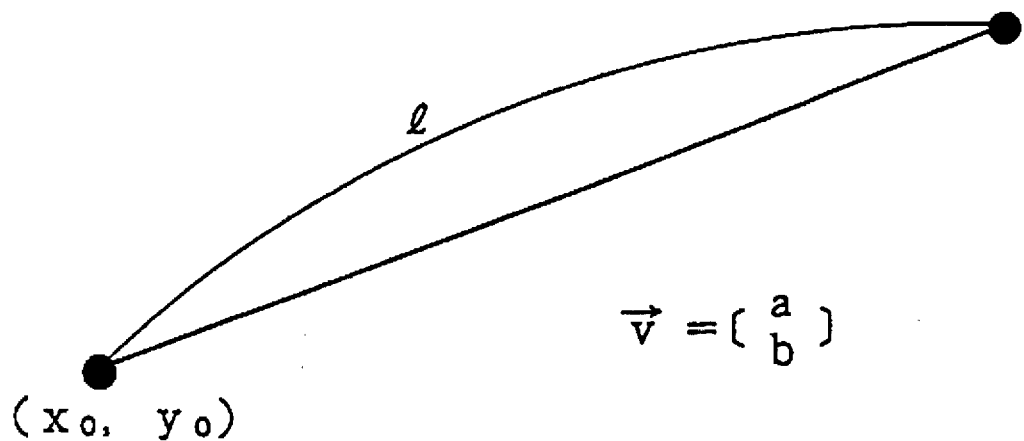
FIG. 11(A) is a diagram illustrating a two-dimensional line segment.
FIG. 11(B) is a diagram showing a data format of the two-dimensional line segment.

FIG. 11(A) illustrates a two-dimensional line segment, and FIG. 11(B) shows a data format of the graphic element of the line segment. As shown in FIGS. 11(A) and 11(B), a two-dimensional line segment can be represented by coordinates $(x_0, y_0)$ of a start point of the line segment, a directional unit vector $\vec{v}$ of the line segment, and a length 1 of the line segment. Since the directional unit vector of the line segment can be expressed by a unit vector "a" in the x-axis direction and a unit vector "b" in the y-axis direction as follows:

$$\vec{v} = \begin{bmatrix} a \\ b \end{bmatrix}, \tag{1}$$

data indicative of the graphic element of the line segment are represented by $x_0$, $y_0$, a, b, and 1, and held in a format as shown in FIG. 11(B). The first item of the data is a type number indicating the type of the graphic element. If the graphic element is a two-dimensional line segment as shown, then "2" is assigned to the type number. The identifier (ID) of the graphic element, which is determined uniquely when the graphic element is drawn, represents the first address of the data where the type number is present. The length 1 of the line segment is l>0. If l=0, then it represents an infinite line. If l=16.0×10$^{31}$ (the square root of the maximum value of a real number), then it represents a semi-infinite line.

Figure 12:
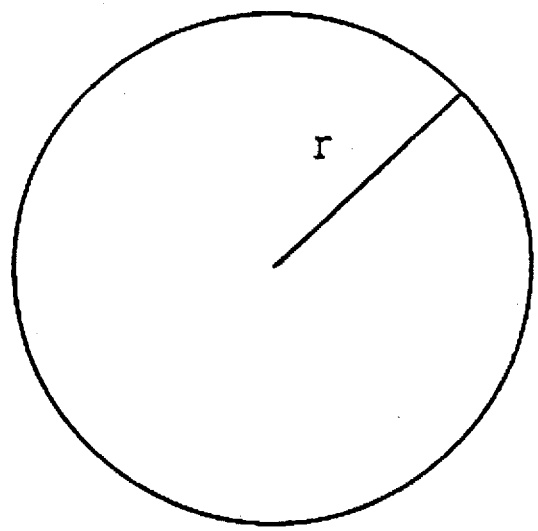
FIG. 12(A) is a diagram showing a two-dimensional circle.
FIG. 12(B) is a diagram showing a data format of the two-dimensional circle.
Figure 12:
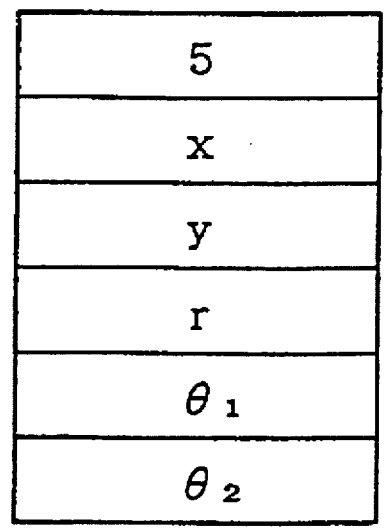

FIG. 12(A) illustrates a two-dimensional circle, and FIG. 12(B) shows a data format of the graphic element of the circle. As shown in FIGS. 12(A) and 12(B), a two-dimensional circle can be represented by coordinates (x, y) of a center of the circle and a radius "r" of the circle. Data representing the graphic element of the circle are held in a format as shown in FIG. 12(B), which includes, in addition to the above data, a starting angle $\theta_1$ and a relative angle $\theta_2$ (in radian) up to an end point in order to share the same data format as an arc. For a circle, the starting angle $\theta_1$ is held as a fixed value of "0" and the relative angle $\theta_2$ up to an end point as a fixed value of "2π". The type number of a two-dimensional circle is assigned "5", for example.

Figure 13:
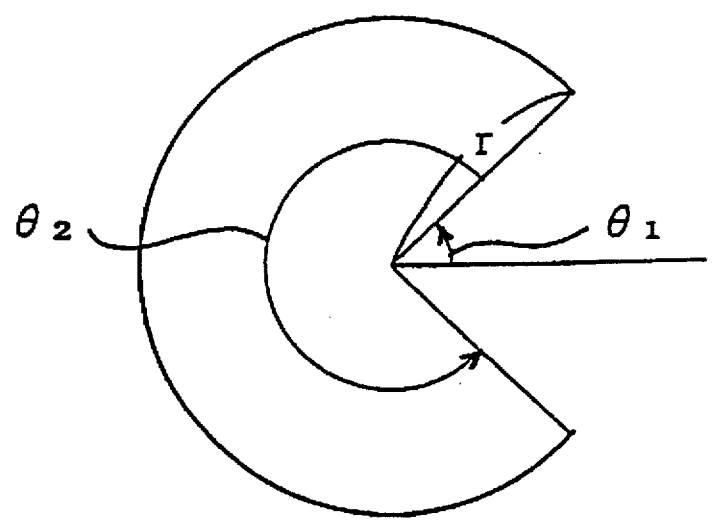
FIG. 13(A) is a diagram showing a two-dimensional arc.
FIG. 13(B) is a diagram showing a data format of the two-dimensional arc.
Figure 13:
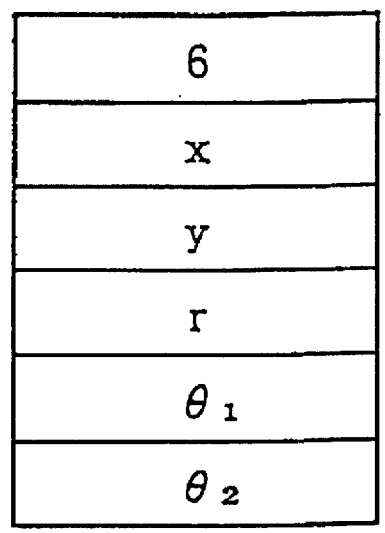

FIG. 13(A) illustrates a two-dimensional arc, and FIG. 13(B) shows a data format of the graphic element of the arc. As shown in FIGS. 13(A) and 13(B), a two-dimensional arc can be represented by coordinates (x, y) of a center of the arc, a radius "r" of the arc, a starting angle $\theta_1$, and a relative angle $\theta_2$ up to an end point. The starting angle $\theta_1$ is in the range of:

$$-2\pi < \theta_1 \leq 2\pi \tag{2},$$

and the relative angle $\theta_2$ up to an end point is in the range of:

$$-2\pi \leq \theta_2 \leq 2\pi (\theta_2 \neq 0) \tag{3}.$$

The arc is drawn counterclockwise if $\theta_2 > 0$, and clockwise if $\theta_2 < 0$. The type number of a two-dimensional arc is assigned "6", for example.

Figure 14:
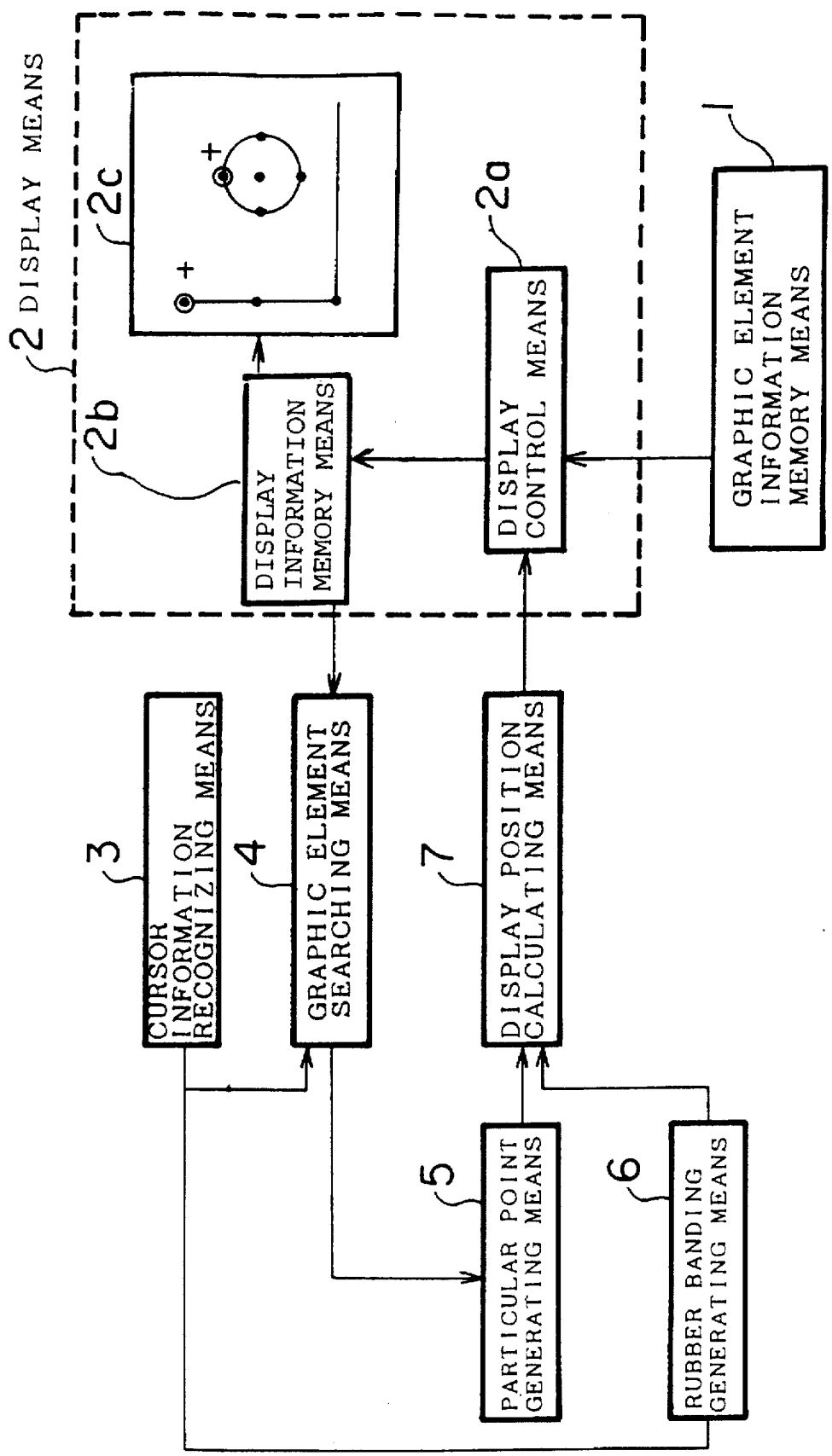
FIG. 14 is a block diagram of a functional system illustrative of the principles of the present invention.

FIG. 14 shows in block form a functional system illustrative of a navigation display apparatus according to the principles of the present invention. As shown in FIG. 14, the navigation display apparatus has a graphic element information memory means 1 for storing information relative to graphic elements including a straight line, a circle, and an arc. Display means 2 displays a graphic form or pattern based on information read from the graphic element information memory means 1. The display means 2 comprises a display control means 2a for converting graphic element information stored in the graphic element information memory means 1 into display information, a display information memory means 2b for storing display information, and a display unit 2c for displaying display information stored in the display information memory means 2b. The navigation display apparatus also has a cursor information recognizing means 3 for recognizing a present position of a cursor and a position where the cursor is hit or clicked, a graphic element searching means 4 for searching graphic elements displayed by the display means 2 for a graphic element close to the present position of the cursor, a particular point generating means 5 for generating particular points of the graphic element located by the graphic element searching means 4, a rubber banding generating means 6 for temporarily generating a graphic element to be created from the position where the cursor is hit and the present position of the cursor, the positions being recognized by the cursor information recognizing means 3, and a display position calculating means 7 for calculating display positions for the particular points generated by the particular point generating means 5 and a rubber banding pattern generated by the rubber banding generating means 6. Although not shown, the display position calculating means 7 further has means for calculating a particular point closest to the cursor, among all the particular points of a graphic element which have been generated by the particular point generating means 5, and displaying the calculated particular point in emphasis on the display means 2.

According to the navigation display apparatus which is illustrated in the drawings, information of graphic elements generated by a CAD system is stored in the graphic element information memory means 1. The display means 2 displays graphic elements based on the graphic element information stored in the graphic element information memory means 1. Specifically, in the display means 2, the display control means 2a converts the graphic element information stored in the graphic element information memory means 1 into display information, which is stored in the display information memory means 2b, and the display unit 2c displays the display information stored in the display information memory means 2b. The cursor information recognizing means 3 recognizes a graphic element search range around the cursor, the present position of the cursor, and a hit position obtained when a button on the mouse is clicked. The graphic element searching means 4 searches the graphic elements being displayed by the display means 2 for a graphic element close to the present position of the cursor, i.e., a graphic element located in a search range. The particular point generating means 5 generates particular points of the graphic element located by the graphic element searching means 4. The rubber banding generating means 6 temporarily generates a graphic element to be created, based on the hit position and the present position of the cursor which are supplied from the cursor information recognizing means 3. The display position calculating means 7 calculates display positions for the particular points generated by the particular point generating means 5 and the rubber banding pattern generated by the rubber banding generating means 6, and sends the calculated display positions to the display means 2 for the display on a display screen. The display position calculating means 7 also calculates a particular point closest to the cursor, among all the particular points possessed by the graphic element which are generated by the particular point generating means 5, and instructs the display means 2 to display the calculated particular point in emphasis.

Figure 15:
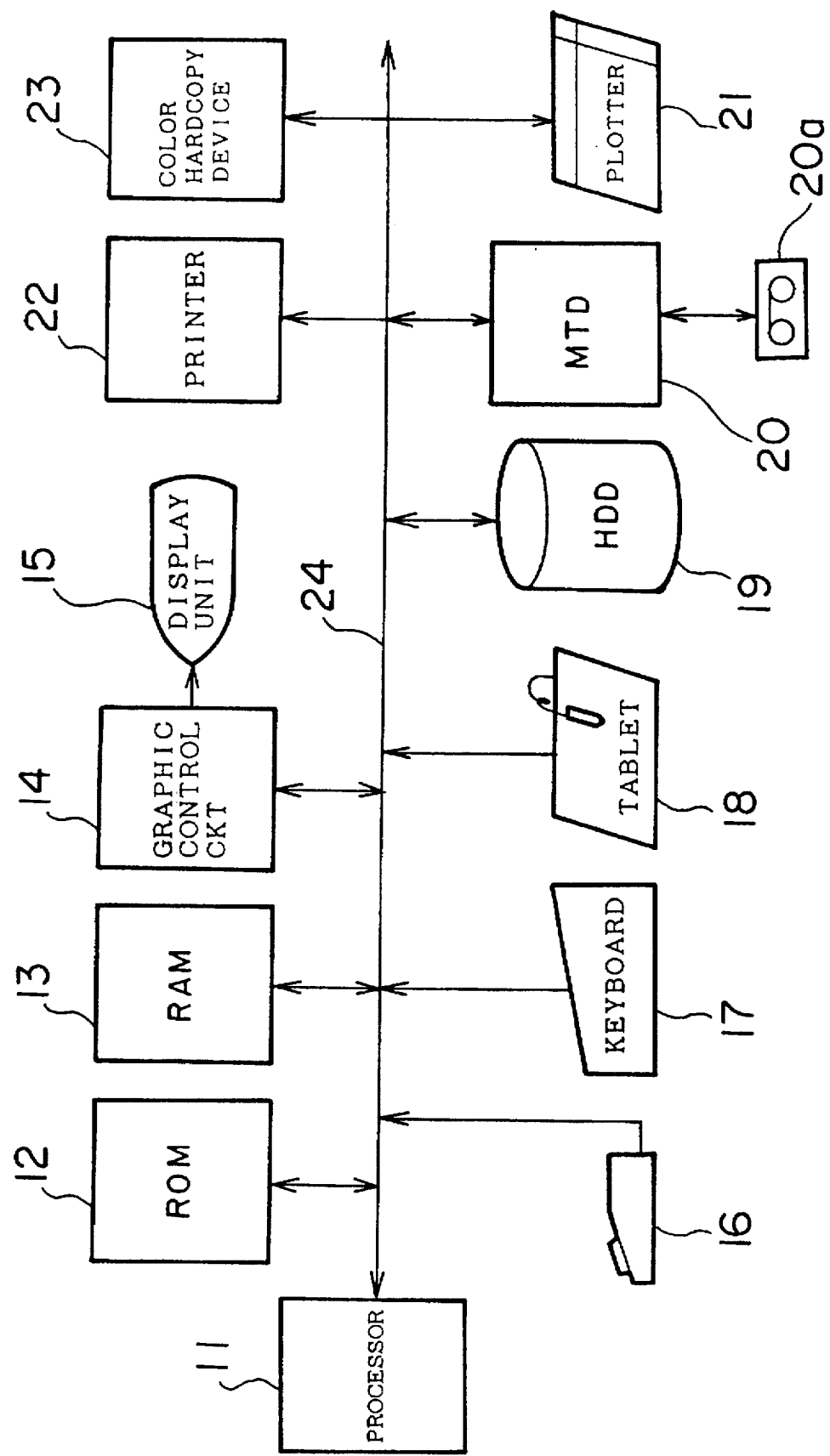
FIG. 15 is a block diagram of a hardware arrangement of a workstation for carrying out the present invention.

FIG. 15 shows in block form a hardware arrangement of a workstation for carrying out the present invention. The workstation comprises a processor 11, a read-only memory (ROM) 12, a main memory (RAM) 13, a graphic control circuit 14, a display unit 15, a mouse 16, a keyboard 17, a tablet 18, a hard disk drive (HDD) 19, a magnetic tape drive (MTD) 20, a plotter 21, a printer 22, and a color hardcopy device 23. These components of the workstation are interconnected by respective interface controllers (not shown) and a bus 24.

The processor 11 controls the workstation in its entirety. The read-only memory 12 stores a program required when the workstation is to be started. The main memory 13 stores a system program and an application program for a CAD system, and also generates and stores data which are being generated or edited.

The graphic control circuit 14 has a frame memory or the like, and converts various graphic element data including two-dimensional line segment, circle, and arc data which are generated in the main memory 13 into the display signals, and sends the converted display signals to the display unit 15. The display unit 15 displays a graphic drawing composed of graphic elements based on a display signal received from the graphic control circuit 14.

The mouse 16 comprises a pointing device for moving a cursor displayed on the display screen of the display unit 15, hitting a graphic element displayed on the display screen by clicking a button on the mouse, and indicating selection of various menus. The keyboard 17 is used to enter numerical data such as of a search range. The tablet 18 is used to enter coordinates when a graphic drawing is to be generated.

The hard disk drive 19 stores a system program, an application program for a CAD system, various graphic element data required to produce drawings, and a search range setting table. The magnetic tape drive 20 comprises an external memory device for entering data such as of design drawings stored in a magnetic tape 20a, and storing data such as of generated design drawings in the magnetic tape 20a.

Data of generated design drawings are transmitted to the plotter 21, the printer 22, or the color hardcopy device 23, so that they can be obtained as graphic drawings.

With the present invention, as described above, when a graphic element is to be created in relation to a graphic element which has already been generated, a cursor is moved closely to the generated graphic element to display all particular points of the generated graphic element, and a particular point closest to the cursor is displayed in emphasis. Because of such a guidance display function employed, erroneous data entry is reliably prevented from occurring, and wrong drawings are prevented from being drawn inadvertently as particular points are necessarily displayed even on complex drawings. Since data are not required to be reentered many times, the user is freed from tedious and time-consuming operations, and can devote himself to the generation of drawings.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of navigation display for displaying on a display screen proposed selection points of a graphic element to aid an operator to perform manual coordinate selection in an interactive CAD system, the method comprising the steps of:

(a) obtaining, from a search range setting table, a search range disposed around a cursor on the display screen of the CAD system for searching for said graphic element having at least a portion thereof contained in the search range;

(b) obtaining a present position of the cursor;

(c) identifying said graphic element which is positioned in said search range that is disposed around the present position of the cursor and obtaining an identifier thereof;

(d) based on said identifier, determining a plurality of all selection points of said graphic element, definitions of said selection points having been predetermined for each type of graphic element so as to include at least points that define the shape of the graphic element;

(e) displaying said plurality of all selection points which have been determined on the display screen with symbols distinguishable from other points displayed on the display screen;

(f) determing one of said all selection points which is closest to said cursor; and (g) displaying the determined one of said all selection points in emphasis with a symbol distinguishable from the other selection points, thereby prompting the operator to make a selection, said steps (a) through (g) being repetitively carried out at predetermined intervals while the CAD system is awaiting an indication of selection from the operator.

2. A method according to claim 1, wherein said step (d) comprises the substeps of:

(d1) determining the type of said graphic element as being one of a straight line, a circle, and an arc; and (d2) determining said plurality of all selection points according to the type of said graphic element.

3. A method according to claim 2, wherein said substep (d2) comprises the substeps of:

(d2a) if the type of graphic element is the straight line, determining both end points of the straight line; and (d2b) determining a midpoint of the straight line.

4. A method according to claim 2, wherein said substep (d2) comprises the substeps of:

(d2a) if the type of the graphic element is the circle, determining a center of the circle;

(d2b) determining vertexes on a circumference of the circle, each of the vertexes taking a minimum or a maximum coordinate value in each coordinate axis; and (d2c) if a new graphic element is being created, determining a point of contact between the circle and said new graphic element being created.

5. A method according to claim 2, wherein said substep (d2) comprises the substeps of:

(d2a) if the type of the graphic element is the arc, determing a center of the arc;

(d2b) determining both end points of the arc;

(d2c) determining vertexes on the arc, each of the vertexes taking a minimum or a maximum coordinate value in each coordinate axis; and (d2d) if a new graphic element is being created, determining a point of contact between the arc and said new graphic element being created.

6. An apparatus for navigation display for displaying on a display screen proposed selection points of a graphic element to aid an operator to perform manual coordinate selection in an interactive CAD system, the apparatus comprising:

graphic element information memory means for storing graphic element information related to graphic elements including a straight line, a circle, and an arc which are required to produce a drawing;

display means for displaying said graphic elements based on graphic element information read from said graphic element information memory means;

cursor information recognizing means for recognizing a search range for one of said graphic elements, a position of a cursor being displayed by said display means, and a hit position where the displayed cursor is clicked;

graphic element searching means for recognizing the one of said graphic elements in said search range, among said graphic elements being displayed by said display means, and outputting an identifier of said recognized graphic element;

selection point generating means for generating all selection points of the one of said graphic elements based on the identifier thereof output from said graphic element searching means, definitions of said selection points having been predetermined for each type of graphic element so as to include at least points that define the shape of the graphic element;

rubber banding generating means for generating a rubber banding pattern of a new graphic element to be created from the present position of the cursor and the hit position which are recognized by said cursor information recognizing means; and display position calculating means for calculating display positions for the selection points generated by said selection point generating means and the rubber banding pattern generated by said rubber banding generating means, and instructing said display means to display the selection points with symbols distinguishable from other points displayed on the display screen and the rubber banding pattern in the calculated display positions.

7. An apparatus according to claim 6, wherein said display position calculating means comprises means for calculating one of said all selection points which is closest to the cursor, and instructing said display means to display the one of said all particular points in emphasis with a symbol distinguishable from the other selection points displayed on the display screen.

* * * * *

UNITED STATES PATENT AND TRADEMARK OFFICE
CERTIFICATE OF CORRECTION

PATENT NO. : 5,632,008
DATED : May 20, 1997
INVENTOR(S) : Hiromi YOKOYAMA

It is certified that error appears in the above-indentified patent and that said Letters Patent is hereby corrected as shown below:

Col. 3, line 57,    change "5 mmx5 mm" to --5mm x 5mm--.
Col. 6, line 51,    delete "not".
Col. 8, line 12,    change "1" to --$\ell$--;
        line 21,    change "1" to --$\ell$--;
        line 29,    change "1" to --$\ell$--;
                    change "1 > 0" to --$\ell$ > 0--; and
        line 30,    change "1" to --$\ell$--.

Signed and Sealed this

Twenty-second Day of July, 1997

Attest:

BRUCE LEHMAN

*Attesting Officer*          *Commissioner of Patents and Trademarks*